Jan. 3, 1961     J. TURCK     2,967,247
GONIOMETER WITH IMAGE ANALYSIS BY FREQUENCY MODULATION
Filed June 14, 1954     3 Sheets-Sheet 2
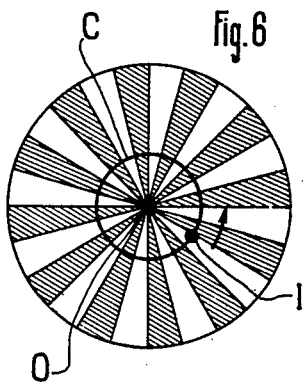
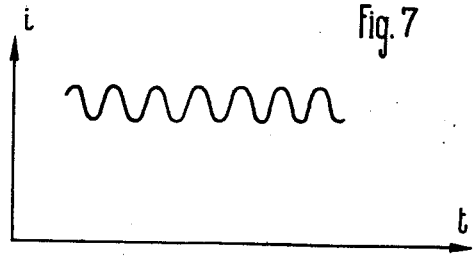
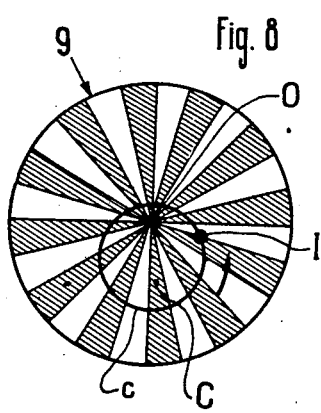
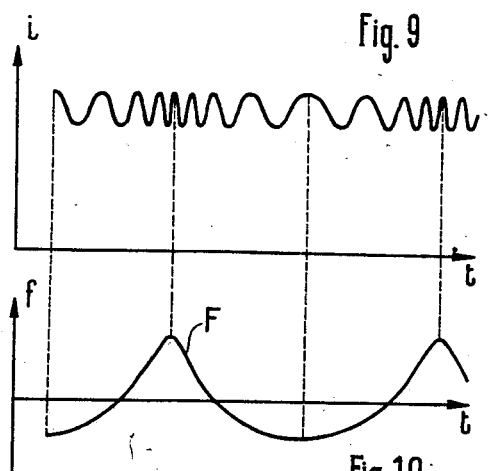
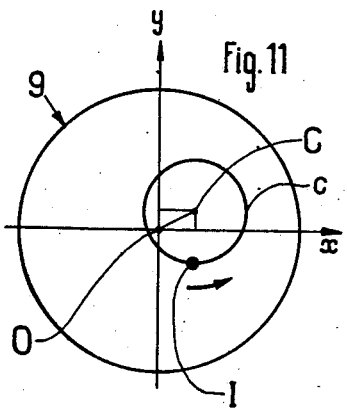
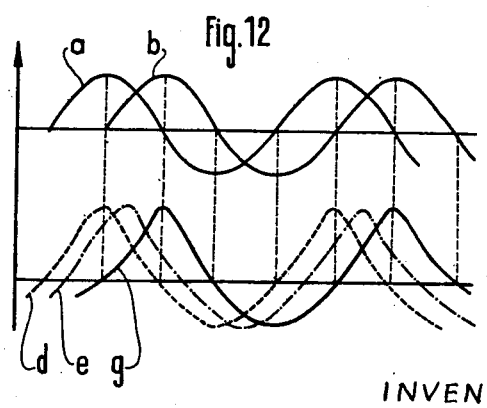
INVENTOR
JEAN TURCK
By
ATTORNEY

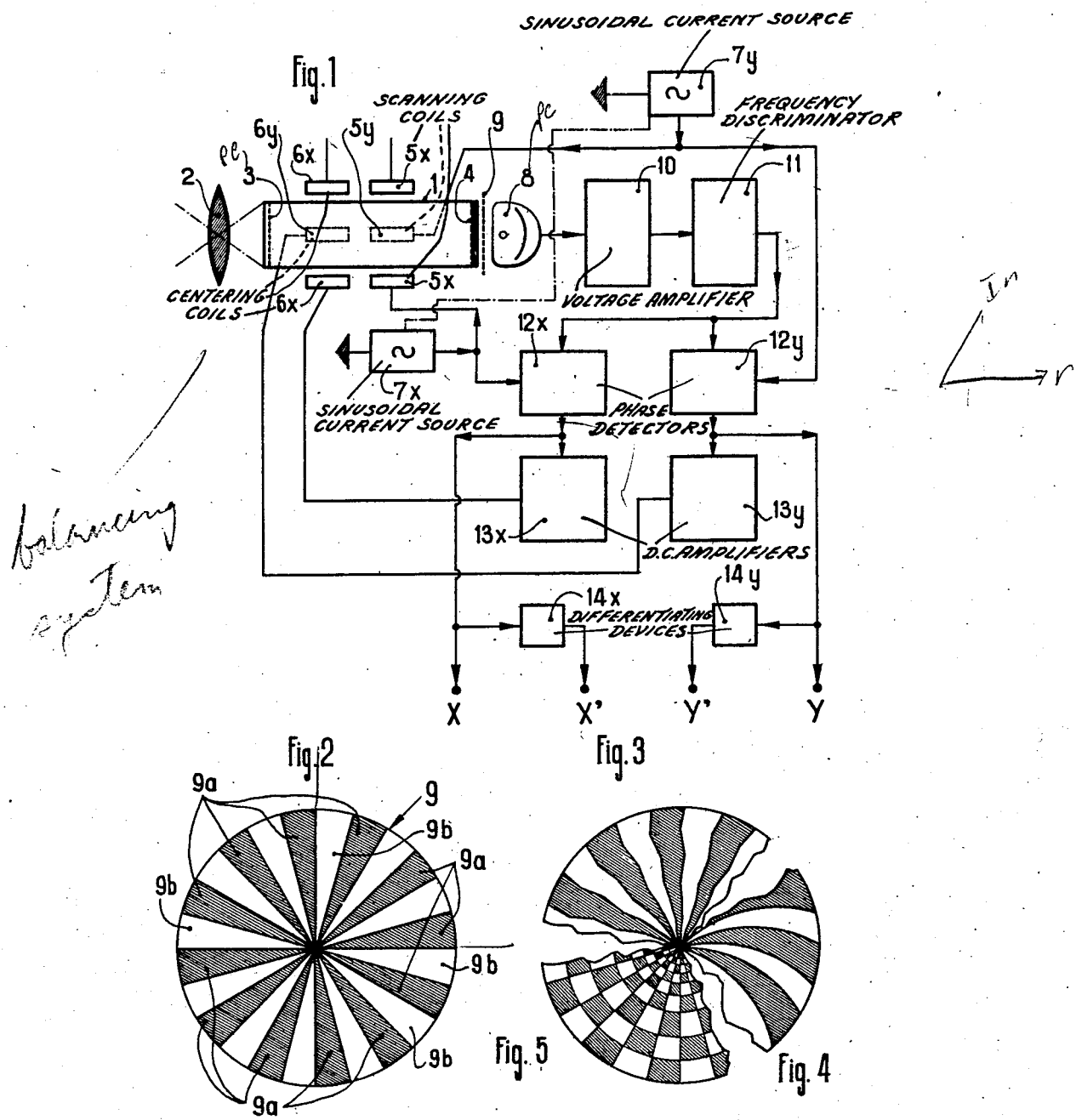

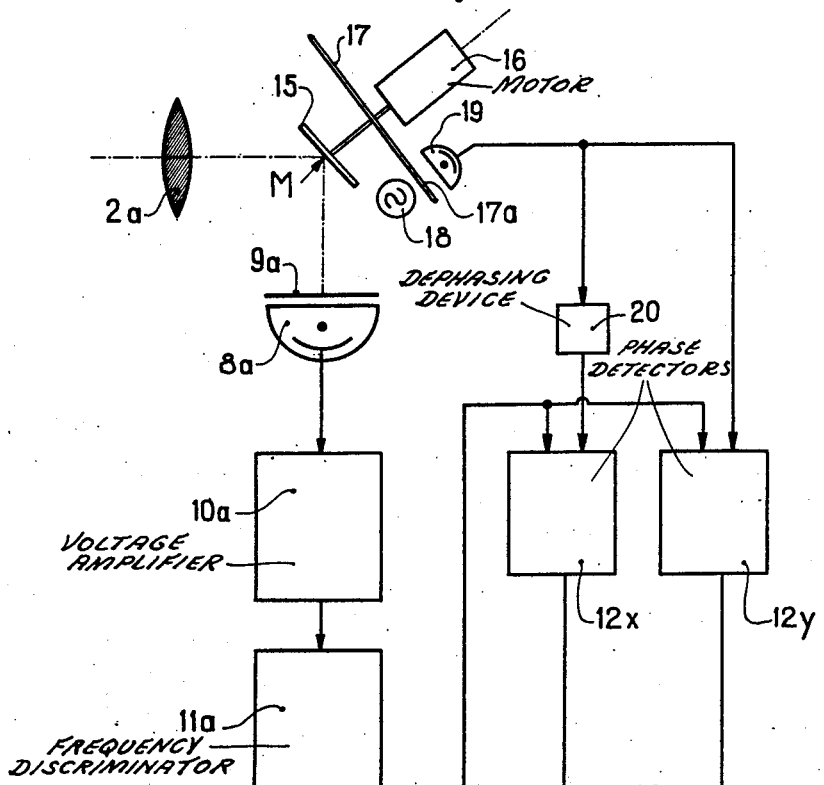
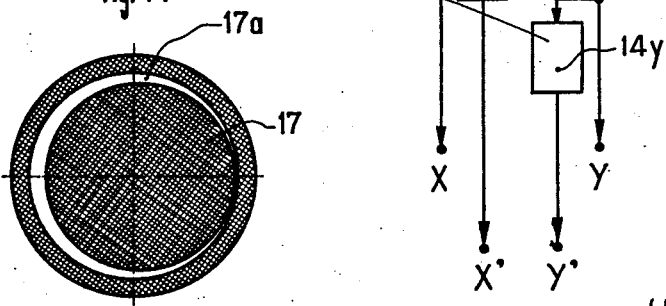

United States Patent Office

2,967,247
Patented Jan. 3, 1961

2,967,247

GONIOMETER WITH IMAGE ANALYSIS BY FREQUENCY MODULATION

Jean Turck, Cachan, France (139 Rue de la Tour, Paris 16, Seine, France)

Filed June 14, 1954, Ser. No. 436,575

Claims priority, application France June 17, 1953

6 Claims. (Cl. 250—203)

This invention relates to a new goniometer in which the image of a viewed objective produces the modulation of an electric current, the frequency of the modulation varying as a function of the position of the objective with respect to an axis of the goniometer.

Electronic goniometers are already known which comprise an electronic tube the front end of which carries a photo-cathode onto which a suitable lens throws the image of some objective whose movements are to control the operation of a servo-mechanism, the said photo-cathode emitting a beam of electrons which, by a suitable electronic lens, reproduces, on an electron-receiving target compound of several quadrant shaped elements and located at the opposite end of the tube, an electronic image which is similar to the optical image received by the photo-cathode. The electronic beam is controlled in its path by centering means coupled to an electronic device connected to the elements of the target, in such manner that any angular displacement of the objective relatively to a given reference position (such as the axis of the tube) causes the electronic device so to operate the centering means as to restore the electronic image to a reference position on the target, the energy supplied to the centering means by the said electronic device being a function of the angular displacement of the objective, so that said displacement is measurable. By derivation in relation to the time, of said energy, it is also possible to measure the angular velocity of displacement of the objective.

It has been proposed, in an apparatus of this type, to control the energy supplied to the centering means as a function of the duration of the signals coming from the elements of the target which is scanned by the above-mentioned electronic beam to which is imparted a rotary motion resulting from a field turning at constant speed due to deflecting means separate from the centering means. However, the using of the duration of the signals coming from the target elements for centering the electronic beam and measuring the displacement of the objective renders the electronic device somewhat complicated and lacking in precision.

The present invention makes it possible for the problems which arise in detecting the angular displacements of an object upon which a goniometer is directed (and the speed of such displacements) to be solved in particularly simple fashion.

According to the invention, the energy which is a function of the objective displacements and which allows the measurement of said displacements is produced by a frequency variation which is easy to detect with precision.

The goniometer to which the invention relates is especially characterized by the fact that it comprises, in combination, a photoelectric detector; passive modulating means (passive modulation) located in front of said detector and having the structure of a grid comprising radially directed opaque sectors alternating with non opaque sectors for controlling the light received by said detector; a photographic lens in front of said modulating means for projecting onto the latter an image of the observed objective; control means adapted for producing a periodic relative movement, along a closed path, between the projected image and the modulating means so that the luminous energy received by the said detector is modulated a two phase current generator connected with said control means so as to work in synchronism therewith; a frequency discriminator connected with the photoelectric detector for detecting the frequency of the electric energy furnished by the said photoelectric detector; and two phase detectors connected with the frequency discriminator and with the two phase current generator, in order to be controlled by the said frequency discriminator and in synchronism with said control means, so that, on account of the periodic relative movement between the projected image and the modulating means, each deviation of the position of the center of said movement with respect to a reference position given by the modulating means, said phase detectors produce voltages which are functions of the position of the observed objective. The above mentioned control means may be of the mechanical type or of the electronic type.

Other peculiarities and characteristics of the invention will be apparent from the descrpition here following which relates to two examples given purely for the sake of illustration and shown diagrammatically in the attached drawings, wherein:

Fig. 1 shows the general arrangement of the goniometer of the type with electronic scanning;

Fig. 2 is a front view of the passive modulating means used in the goniometer of Figs. 1 and 13;

Figs. 3, 4 and 5 are partial front views of different variations of passive modulating means;

Fig. 6 shows a passive modulating means intercepting an image displaced along a scanning circle which is concentric with the axis of the said modulator;

Fig. 7 shows the curve of modulation of the energy collected by the photo electric detector in the case of the concentric scanning represented in Fig. 6;

Fig. 8 is analogous to Fig. 6 when the scanning circle of the image is off-centre with respect to the axis of the passive modulating means;

Figs. 9 and 10 show respectively the modulation curve and the corresponding frequency curve in the case of the eccentric scanning shown in Fig. 8;

Figs. 11 and 12 show the relation between the eccentricity of the scanning circle on the one hand, and the voltages of the scanning sources and the frequency curves which make it possible to ascertain the co-ordinates of the scanning circle with reference to an axis system on the other hand;

Fig. 13 shows the arrangements of a goniometer with mechanical scanning; finally, Fig. 14 shows a detail of the arrangement of Fig. 13.

Referring to Figs. 1 and 2, the arrangement includes a photo-electronic tube 1 having before its front end a photographic lens 2 which throws, onto a photo-cathode 3 carried by the front end of the tube, an optical image of the objective viewed, which is assumed to lie substantially along the axis of the tube. At the opposite end of the tube 1 is a fluorescent screen 4 on which falls the electronic beam thrown out by the photo-cathode so as to form on the screen a secondary luminous image which is a replica of that cast by the lens. The electronic beam projected onto the screen 4 is deflected, on the one hand, by circularly scanning coils 5x—5y and, on the other hand, by centering coils 6x—6y.

A generator of two phase current comprising two coils 5x—5y is fed by scanning sources of sinusoidal current $7x-7y$ of constant frequency, which may with advantage be so coupled to one another that the generated currents differ in phase by 90°.

Behind the screen 4 of tube 1 is a photo-electric cell 8 and, in front of this, a passive modulating means (see Fig. 2) formed by a grid 9 comprising radially directed opaque sectors $9a$ alternating with non-opaque sectors $9b$.

The cell 8 is connected to a voltage amplifier 10 whose outlet is connected to the input of a frequency discriminator 11. The outlet from the frequency discriminator 11 is connected to two phase detectors $12x$ and $12y$ in parallel to which are applied the scanning voltages (reference phases) produced by the sources $7x$ and $7y$ respectively.

The phase detectors $12x$ and $12y$ govern the respective D.C. amplifiers $13x$ and $13y$ which supply the required energy to the respective centering deflectors coils $6x$ and $6y$.

At the terminals X and Y connected to the outputs of the respective phase-detectors $12x$ and $12y$ appear voltages which, as will hereinafter be apparent, are proportional to the coordinates of the objective with respect to a reference position defined by the axis of the tube 1, passing through the centre of the grid 9.

The terminals X and Y can, therefore, be connected to a servo-control (as for instance the servo-motor for an automatically piloted device such as a teleguided missile).

Differentiating devices $14x$ and $14y$ connected to the respective terminals X and Y make it possible to obtain, at the output terminals X' and Y', voltages which are the derivatives, with respect to the time, of the voltages appearing at terminals X and Y.

The arrangement described above operates as follows assuming that the tube 1 is pointed at an objective to be watched, the secondary optical image of which appears on the fluorescent screen 4.

If the objective viewed is exactly on the axis of the tube and there is no circular scanning, its image will be located exactly at the centre of the passive modulating device or grid 9. With circular scanning, due to the scanning coils $5x$ and $5y$ being excited by the sinusoidal current sources $7x$ and $7y$, the image I in Fig. 6 moves over the grid 9, along a circle $c$ whose centre C coincides with the centre O of the grid. Consequently, the cell 8 receives luminous energy which is modulated to a constant frequency for each cycle of scanning and thus delivers a current which is modulated to a constant frequency for said cycle (see modulation curve in Fig. 7). The frequency discriminator 11 will not, therefore, apply any voltage to the phase-detectors $12x$, $12y$. These last will not produce any voltage at the output terminals X and Y, and the amplifiers $13x$, $13y$ will not supply energy to the centering coils $6x$, $6y$.

If the objective viewed is going out to the axis of the tube 1, the circle $c$ described by the image I is no longer concentric with the grid 9 (see Fig. 8) and, during each cycle of scanning, the frequency of the modulated current issued from the cell 8 varies about the constant frequency (see Fig. 9). Hence, the frequency discriminator 11 applies to the phase-detectors $12x$ and $12y$ a voltage represented by the curve F in Fig. 10.

The phase-detectors, which are subjected to the varying voltage F and to the voltages $a$ and $b$ of the current sources $7x$ and $7y$ (upper part of Fig. 12) respectively, produce voltages at their output terminals, which correspond to the coordinates of the centre C (see Fig. 11) with respect to the axes $x$ and $y$, in other words to the co-ordinates of the displacement of the viewed objective with respect to the axis O of the tube. At the bottom of Fig. 12: the frequency curve $g$ corresponds to the case where C is on the axis $oy$ in Fig. 11 ($x=0$); the curve $d$ corresponds to the case where C is on the axis $ox$ of Fig. 11 ($y=0$); and the curve $e$ corresponds to the case where C is displaced both from the axis $x$ and from the axis $y$. Hence, the voltages arising at the terminals X and Y can be used for a measurement or for actuating a servo-mechanism (for instance, to govern a piloting mechanism so as to keep the tube 1 continuously pointed at a moving object).

Application of these same voltages to the D.C. amplifiers $13x$ and $13y$ causes them to feed the centering coils $6x$ and $6y$ so as to centre the scanning center $c$ on the axis O, limiting thus the eccentricity of the image to an amount consistent with the characteristics of the various elements comprised in the arrangement and securing servo-operation as a linear function.

The energy collected at the output terminals X' and Y' of the differentiating devices $14x$ and $14y$ is a function of the speed of displacement of the moping objective viewed. Such energy can likewise be used as a correcting factor for the servo-control.

The sectors of the grid 9 need not be bounded by straight lines but can be given any other shape according to the law of variation with which the frequency variation is to comply.

For instance these sectors may be bounded by undulated lines (Fig. 3) or by curved lines (Fig. 4) so as to advance or retard the servo-response or may form a chequer pattern (Fig. 5), etc.

Figs. 13 and 14 show an embodiment of the goniometer which has mechanical scanning.

The lens $2a$ throws the image of the viewed objective onto the grid $9a$ behind which is the photo-electric cell $8a$, the projection being obtained by means of a rotating plane mirror 15, the center of which is indicated by M, the arrangement being such that the distance $2a-M$ plus the distance $M-9a$ correspond to the focal length of the lens $2a$.

This mirror 15 is carried on the shaft of a motor 16 which turns at constant speed, the plane of the mirror making with the shaft an angle different from 90°. Hence, the image thrown on the grid $9a$ describes substantially a circumference.

As in the previous example, the cell $8a$ governs an amplifier $10a$ which in turn is connected to a frequency discriminator $11a$ controlling two phase detectors $12x$ and $12y$.

The reference phases fed into the phase-detectors $12x$ and $12y$ are produced by a device governed by the motor 16. This device consists of an opaque disc 17 mounted on the shaft of the motor 16, the said disc having an annular transparent portion bounded by two non-concentric circles (as shown in Fig. 14).

On one side of the transparent portion $17a$ of the disc 17 is a source of light 18 and on the other side a photoelectric cell 19. At each revolution of the disc 17, the cell 19 is excited by a sinusoidal luminous energy and the sinusoidal current flowing from this cell is fed both into the phase detector $12y$ directly and into the phase detector $12x$ indirectly through a dephasing device 20 which produces a phase displacement of 90°.

In principle this embodiment of the invention operates identically with the electronic embodiment shown in Fig. 1.

At the output terminals of the phase detectors X and Y voltages are obtained which are functions of the angular displacement of the viewed objective with respect to a reference position and which directly indicate the co-ordinates of that objective with reference to an axis system.

It is obvious that the examples of how the new goniometer may be realized which have been described above and are shown in the accompanying drawings are not intended limitatively but solely as illustrations, all kinds of detailed modifications being possible.

What I claim is:

1. An image analysing goniometer, for detecting the movements of an observed objective comprising: a photo-electric detector; passive modulating means located in front of said detector and having the structure of a grid comprising radially directed opaque sectors alternating with non opaque sectors for controlling the light received by said detector; a photographic lens in front of said modulating means for projecting onto the latter an image of the observed objective; control means for producing a periodic relative movement, along a closed path, between the projected image and the modulating means, so that the luminous energy received by the said detector is modulated; a two phase current generator connected with said control means so as to work in synchronism therewith; a frequency discriminator the input of which is connected with the output of the photoelectric detector for detecting the frequency of the electric energy furnished by the said photoelectric detector; and two phase detectors the inputs of which are connected with the output of the frequency discriminator and with the two phase current generator, in order to be controlled by the said frequency discriminator and in synchronism with said control means, so that, on account of the periodic relative movement between the projected image and the modulating means, each deviation of the position of the center of said movement with respect to a reference position given by the modulating means, said phase detectors produce voltages which are functions of the position of the observed objective.

2. A goniometer as claimed in claim 1, wherein the passive modulating means is stationary, whereas the control means are scanning means for moving, along a path substantially circular, the image projected onto said modulating means.

3. A goniometer as claimed in claim 1, further comprising two differentiating devices respectively connected to the output of said phase detectors and controlled by the latter to deliver a voltage which is the derivative, with respect to the time, of the voltage produced by said phase detectors.

4. A goniometer as claimed in claim 1, further comprising a dephasing device inserted between the control means and one of the two phase detectors, so that said phase detectors are both controlled in accordance with the periodic relative movement between the modulating means and the image of the observed objective, and that one of said phase detectors is controlled with a given dephasing with respect to the other phase detector.

5. A goniometer as claimed in claim 1, wherein the control means comprise a rotating mirror interposed on the path of the luminous beam projected from the lens onto the modulating means, power means for rotating the mirror, a modulated current generator actuated by said power means and connected with the two phase detectors.

6. A goniometer as claimed in claim 5, wherein the modulated current generator comprises: a rotative opaque disc operatively connected to the power means and having an annular transparent part demarcated by two non concentric circumferences; a constant light source located on one side of the disc, facing the transparent part; and a photo-electric cell located on the other side of the disc, facing the transparent part, so that said cell receives a luminous flux the intensity of which varies periodically and in synchronism with the rotation of the mirror.

References Cited in the file of this patent

UNITED STATES PATENTS

| | | |
|---|---|---|
| 2,027,393 | McCreary | Jan. 14, 1936 |
| 2,403,023 | Reynolds | July 2, 1946 |
| 2,403,975 | Graham | July 16, 1946 |
| 2,421,012 | Chew | May 27, 1947 |
| 2,425,541 | Konet | Aug. 12, 1947 |
| 2,431,510 | Salinger | Nov. 25, 1947 |
| 2,439,294 | Hammond | Apr. 6, 1948 |
| 2,713,134 | Eckweiler | July 12, 1955 |